US012585789B2

(12) United States Patent
Habibabadi et al.

(10) Patent No.: US 12,585,789 B2
(45) Date of Patent: Mar. 24, 2026

(54) TRAINING AND USING MULTI-TASK PREDICTIVE RISK MODELS IN SOFTWARE APPLICATIONS

(71) Applicant: INTUIT INC., Mountain View, CA (US)

(72) Inventors: Nazanin Zaker Habibabadi, Sunnyvale, CA (US); Lihua Han, Mountain View, CA (US); Ariel Nikzad, Mountain View, CA (US); Xue Han, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 72 days.

(21) Appl. No.: 18/790,505

(22) Filed: Jul. 31, 2024

(65) Prior Publication Data
US 2026/0037637 A1     Feb. 5, 2026

(51) Int. Cl.
*G06F 21/57* (2013.01)
*G06N 3/0464* (2023.01)

(52) U.S. Cl.
CPC ......... *G06F 21/577* (2013.01); *G06N 3/0464* (2023.01)

(58) Field of Classification Search
CPC ......... G06F 21/577; G06F 21/56; G06F 21/57

USPC .......................................................... 726/25
See application file for complete search history.

(56) References Cited

U.S. PATENT DOCUMENTS

| | | | |
|---|---|---|---|
| 11,227,047 B1 * | 1/2022 | Vashisht | G06N 20/00 |
| 2020/0175314 A1 * | 6/2020 | Fang | G06N 3/048 |
| 2021/0049619 A1 * | 2/2021 | Zarkov | G06Q 30/0201 |
| 2021/0233087 A1 * | 7/2021 | Edwards | G06Q 20/40145 |
| 2021/0295150 A1 * | 9/2021 | Rocznik | G06N 3/045 |
| 2023/0126708 A1 * | 4/2023 | Wadhwa | G06N 20/20 |
| | | | 705/44 |

* cited by examiner

*Primary Examiner* — Teshome Hailu
(74) *Attorney, Agent, or Firm* — Patterson + Sheridan, LLP

(57) ABSTRACT

Certain aspects of the present disclosure provide techniques for executing operations in a software application based on an output of a multi-task machine learning model. An example method generally includes receiving, from a user of a computing system, a request to execute a task in the computing system. Based on receiving the request, an input feature vector is generated based on historical data associated with the user. A plurality of predictive classifications is requested from a multi-output machine learning model based on the input feature vector. Generally, each respective predictive classification of the plurality of predictive classifications is associated with a respective likelihood of whether a specified event will occur for the user. The task is executed based on the plurality of predictive classifications.

20 Claims, 5 Drawing Sheets

100

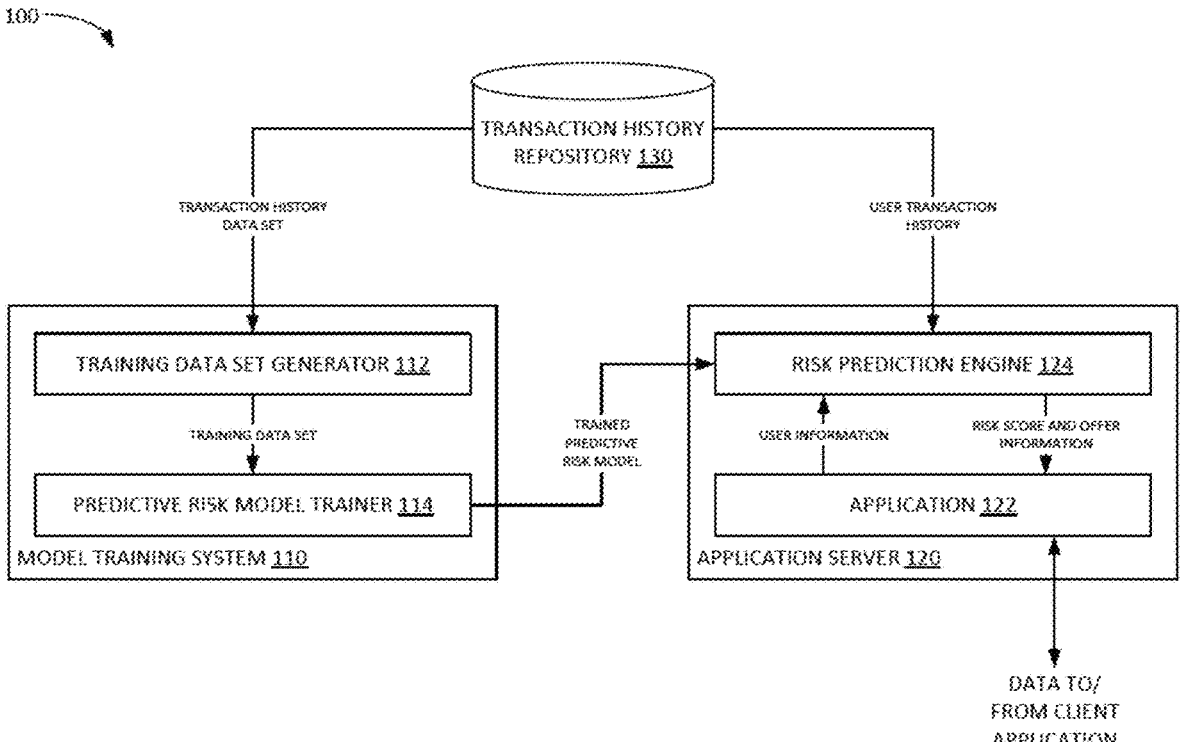

TRANSACTION HISTORY
REPOSITORY 130

TRANSACTION HISTORY
DATA SET

USER TRANSACTION
HISTORY

TRAINING DATA SET GENERATOR 112

TRAINING DATA SET

TRAINED
PREDICTIVE
RISK MODEL

RISK PREDICTION ENGINE 124

USER INFORMATION

RISK SCORE AND OFFER
INFORMATION

PREDICTIVE RISK MODEL TRAINER 114

MODEL TRAINING SYSTEM 110

APPLICATION 122

APPLICATION SERVER 120

DATA TO/
FROM CLIENT
APPLICATION

| | Policy Rule Bucket {1,....,N} | | | | | | |
|---|---|---|---|---|---|---|---|
| | 1 | 2 | 3 | 4 | 5 | ... | N |
| Score Range 1 | LOW | LOW | LOW | LOW | LOW | ... | MED |
| Score Range 2 | LOW | LOW | LOW | LOW | LOW | ... | MED |
| Score Range 3 | LOW | LOW | LOW | LOW | LOW | ... | MED |
| Score Range 4 | MED | MED | MED | MED | MED | ... | MED |
| Score Range 5 | MED | MED | MED | MED | MED | ... | MED |
| Score Range 6 | HIGH | HIGH | HIGH | HIGH | HIGH | ... | HIGH |
| ... | HIGH | HIGH | HIGH | HIGH | HIGH | ... | HIGH |
| Score Range M | HIGH | HIGH | HIGH | HIGH | HIGH | ... | HIGH |

FIG. 2

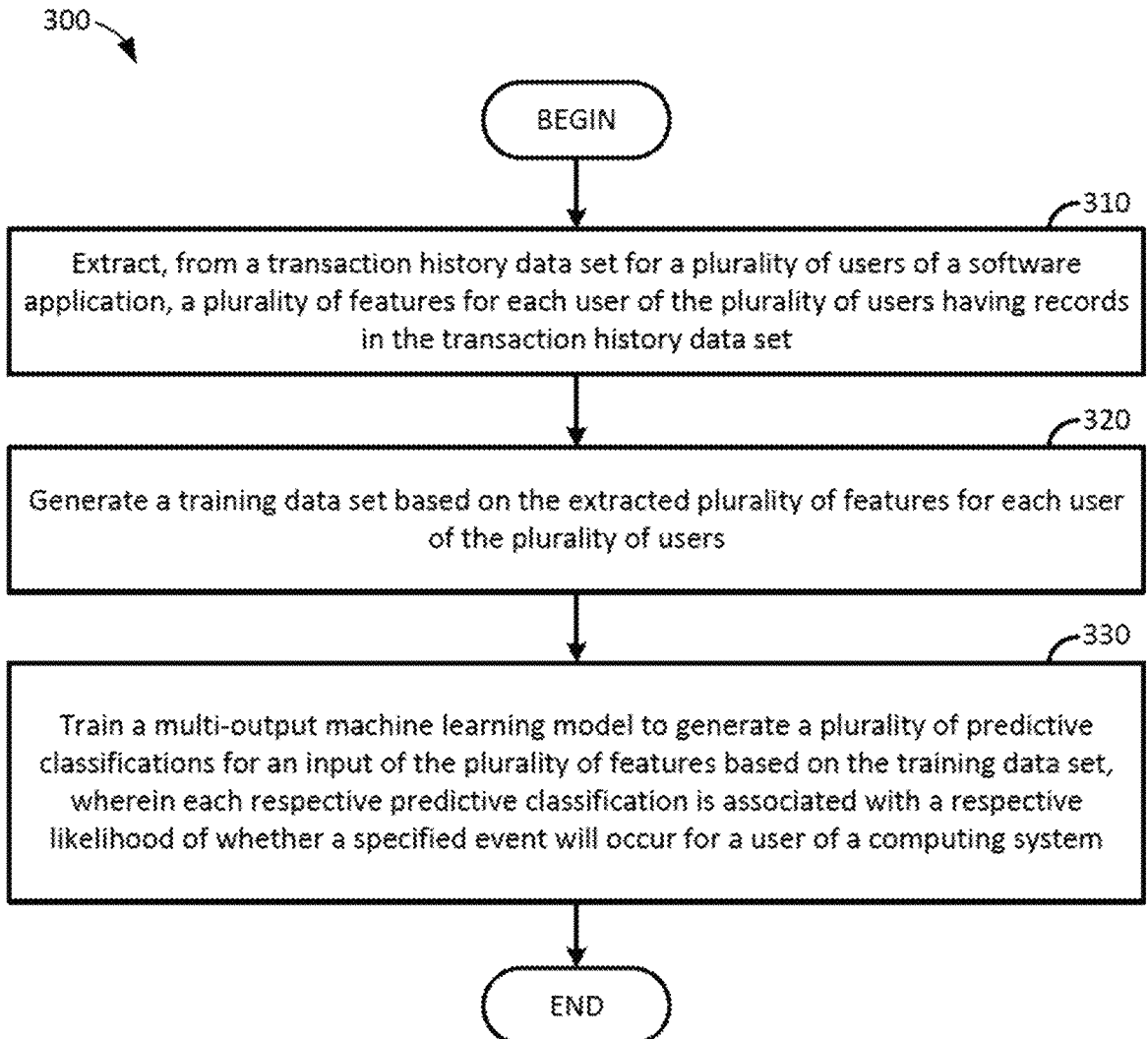

300

BEGIN

310

Extract, from a transaction history data set for a plurality of users of a software application, a plurality of features for each user of the plurality of users having records in the transaction history data set

320

Generate a training data set based on the extracted plurality of features for each user of the plurality of users

330

Train a multi-output machine learning model to generate a plurality of predictive classifications for an input of the plurality of features based on the training data set, wherein each respective predictive classification is associated with a respective likelihood of whether a specified event will occur for a user of a computing system

END

FIG. 3

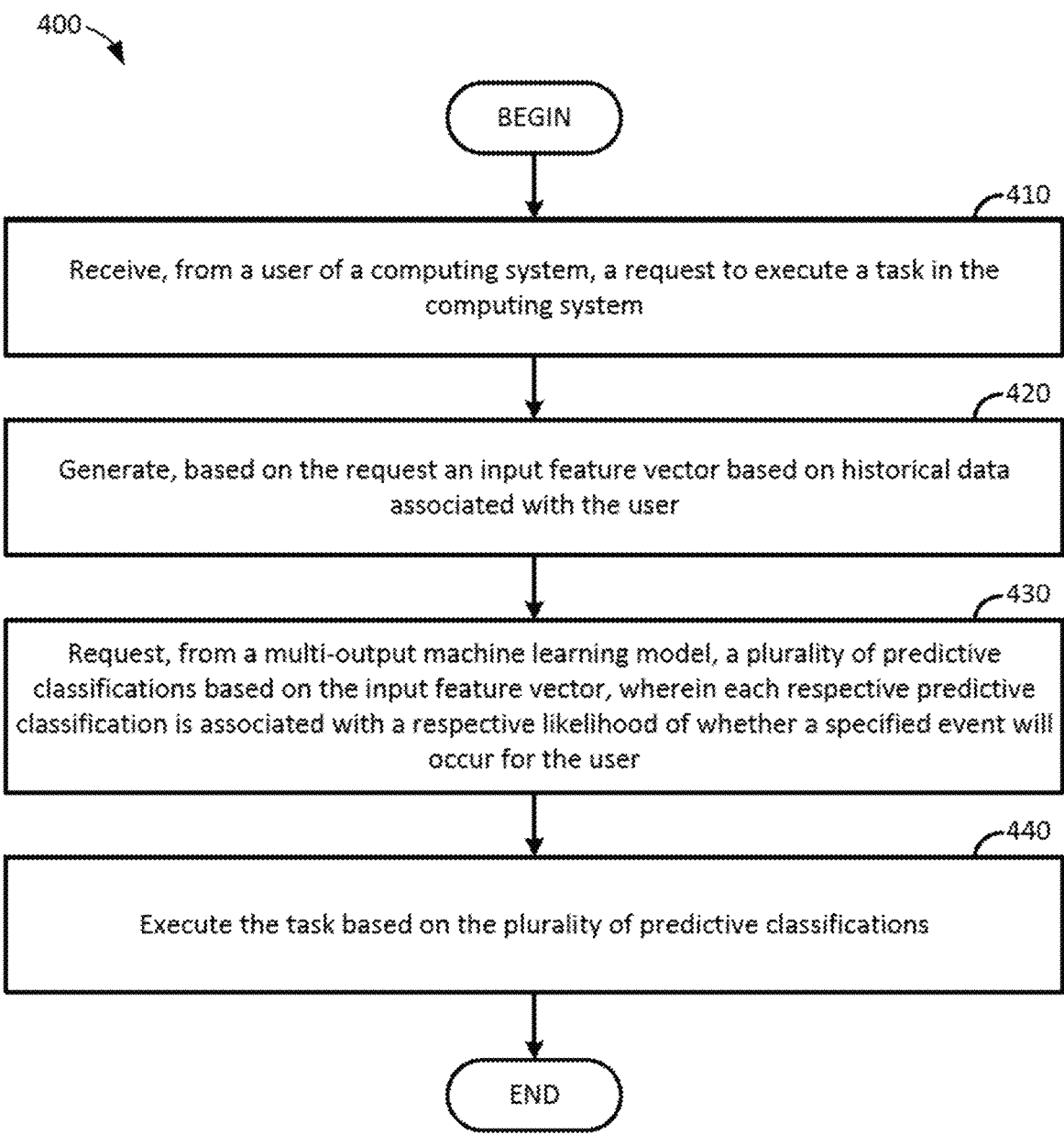

400

BEGIN

410

Receive, from a user of a computing system, a request to execute a task in the computing system

420

Generate, based on the request an input feature vector based on historical data associated with the user

430

Request, from a multi-output machine learning model, a plurality of predictive classifications based on the input feature vector, wherein each respective predictive classification is associated with a respective likelihood of whether a specified event will occur for the user

440

Execute the task based on the plurality of predictive classifications

END

FIG. 4

TRAINING AND USING MULTI-TASK PREDICTIVE RISK MODELS IN SOFTWARE APPLICATIONS

INTRODUCTION

Aspects of the present disclosure relate to computer security, and more specifically to the use of predictive models for controlling the execution of operations in a computing system.

BACKGROUND

Software applications are generally deployed for use by many users for the performance of a specific function. These applications may be deployed, for example, as web applications accessible over a network, such as the Internet or a private network, or as desktop applications that include static components executed from a local device and dynamic components executed from content retrieved from a network location. These applications can include financial applications, such as tax preparation applications, accounting applications, personal or business financial management applications; social media applications; electronic communications applications; and so on. These software applications generally include help functions that users frequently interact with to obtain information about how to perform various tasks within the software application. Some applications may additionally provide execution environments for the use of third-party plugins, extensions, helpers, and other components to add functionality to these applications. These components may be available for users to download or otherwise link to an instance of a software application through an application store.

These software applications may, in some aspects, be subject to various attacks by malicious parties. For example, some software applications may be attacked by users attempting to register fraudulent user identifiers to gain access to these software applications and use these software applications for potentially malicious purposes. In one example, a messaging system used by fraudulent users could be used to generate malicious messages which can be used to obtain personal information (e.g., names, passwords, national identification numbers (e.g., Social Security Numbers in the United States, National Insurance Numbers in the United Kingdom, or the like), etc.) from various persons. In another example, fraudulent users can attempt to obtain access to access-controlled systems, such as multimedia websites, software developer portals, or the like, in order to perform various malicious actions based on access to these access-controlled systems.

In some aspects, these software applications may allow users of a software application to request resources for use in other operations. For example, these applications may be used by a user to request goods or services; however, in doing so, the user may request goods or services that the user is not actually qualified to receive. Further, in some cases, users may not have a risk score from an external provider that can be used to aid in determining offers for which a user may be qualified. For these users, messages may be randomly generated, which, as discussed above, may result in wasted computing resources when irrelevant offers or offers for which the user is not qualified are presented. Even where a user does have a risk score from an external provider, these risk scores may not provide sufficient information to determine whether a user is qualified for an offer.

Thus, techniques are needed for using multi-task machine learning models to control the execution of tasks in a software application.

BRIEF SUMMARY

Certain embodiments provide a computer-implemented method for executing operations in a software application based on an output of a multi-task, multi-output machine learning model. An example method generally includes receiving, from a user of a computing system, a request to execute a task in the computing system. Based on receiving the request, an input feature vector is generated based on historical data associated with the user. A plurality of predictive classifications is requested from a multi-output machine learning model based on the input feature vector. Generally, each respective predictive classification of the plurality of predictive classifications is associated with a respective likelihood of whether a specified event will occur for the user. The task is executed based on the plurality of predictive classifications.

Still further embodiments provide a computer-implemented method for training a multi-task machine learning model for generating predictions related to a plurality of tasks. An example method generally includes extracting, from a transaction history data set for a plurality of users of a software application, a plurality of features for each user of the plurality of users having records in the transaction history data set. A training data set is generated based on the extracted plurality of features for each user of the plurality of users. A multi-output machine learning model is trained to generate a plurality of predictive classifications for an input of the plurality of features based on the training data set. Generally, each respective predictive classification of the plurality of predictive classifications is associated with a respective likelihood of whether a specified event will occur for a user of a computing system.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 1 depicts an example computing environment in which multi-task, multi-output predictive risk models are used to control the execution of tasks in the computing environment, according to aspects of the present disclosure.

FIG. 2 illustrates an example segmentation of users in a multi-task, multi-output predictive risk model, according to aspects of the present disclosure.

FIG. 3 illustrates example operations for training a multi-task, multi-output machine learning model based on a transaction history data set.

FIG. 4 illustrates example operations for controlling the execution of operations in a computing system based on predictive risk scores generated by a multi-task, multi-output predictive risk model, according to aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 5:
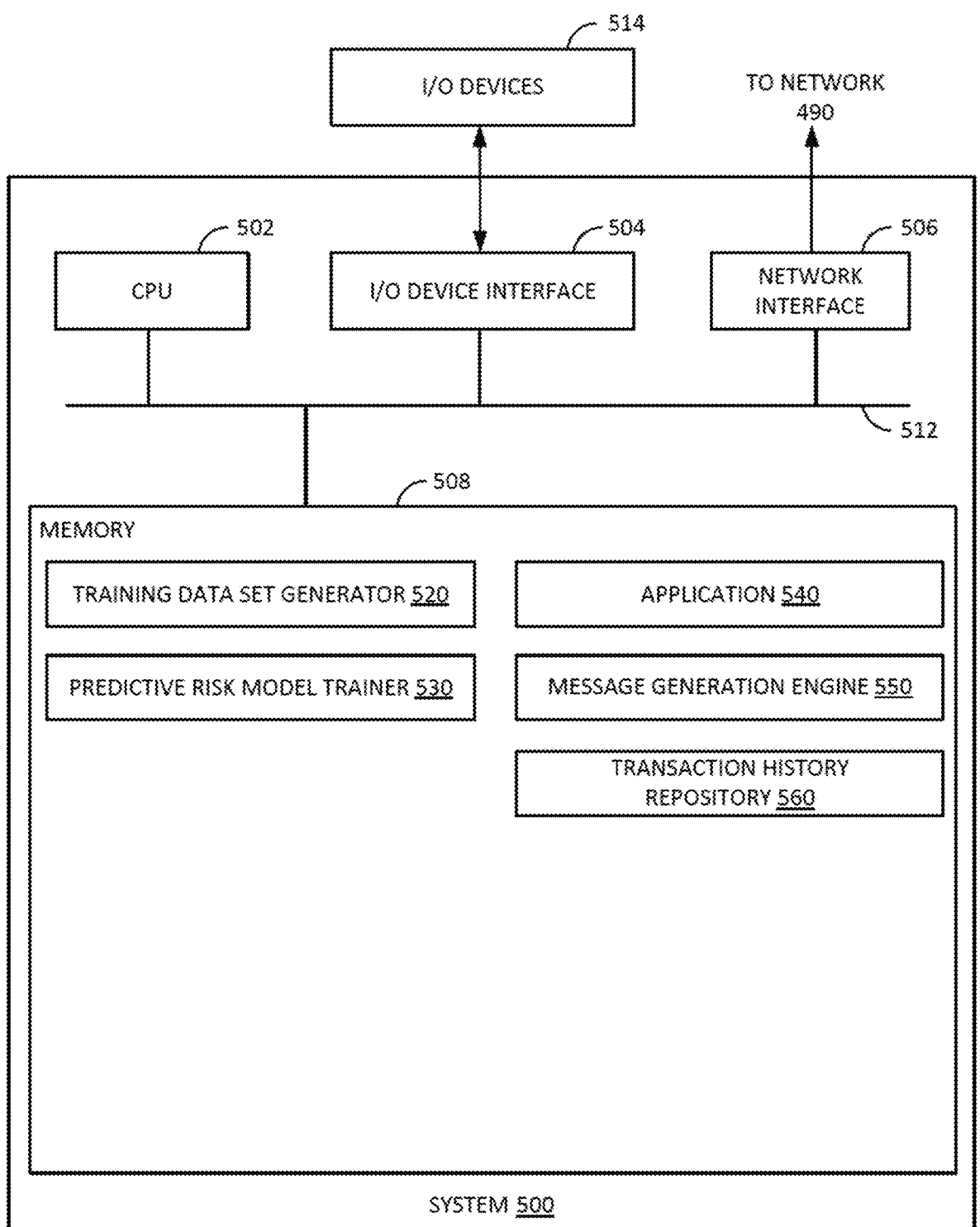
FIG. 5 illustrates an example system on which embodiments of the present disclosure can be performed.

Software applications are generally deployed for use by many users for the performance of a specific function. These applications may be deployed as web applications accessible over the Internet or a private network or as desktop applications including static components executed from a local device and dynamic components executed from content retrieved from a network location. These applications can include financial applications, such as tax preparation applications, accounting applications, personal or business financial management applications, or the like; social media applications; other electronic communications applications; and so on.

Software applications allow users to access various resources using security and other access measures that attempt to allow certain users to access these resources. In some aspects, to do so, predictions of various risks, such as whether a request corresponds to a fraudulent request or a legitimate request, whether the request exposes a system to security threats, whether a user associated with the request is likely or unlikely to complete other actions associated with the request, or the like.

In one example, in some software applications, messages may be presented to various recipients in order to deliver information to such recipients, induce the recipients to perform some action, or the like. The messages presented to a user may be randomly selected by a risk prediction engine. These messages, however, may be for goods or services that are not relevant to the user. Even where a message may be relevant to a user, the user may not actually qualify for the advertised offer. In either case, i.e., delivering messages to a user that are not relevant to the user or messages for offers that a user is not qualified for, resources (e.g., network bandwidth, user data caps, etc.) that could be used for other productive purposes are wasted on the delivery of irrelevant messages to a user.

In another example, in some software applications, requests may be received from users of these applications to access resources and perform actions with respect to these resources. Because these software applications may involve sensitive information which should remain private and may grant users access to resources based on which various malicious actions can be taken (e.g., exfiltration of data or other resources outside of a restricted environment in which these resources should remain, fraudulent transfers of financial assets in a financial application, etc.), these software applications may include various controls to ensure that legitimate requests are processed and to prevent, or at least minimize, the likelihood of malicious or fraudulent requests from being executed.

To maintain security measures associated with resources in a computing system and to ensure the efficient use of resources in the computing system to deliver customized messages to users of a software application, machine learning models can be used to generate various risk-related scores that can in turn be used to determine whether to perform an action within a computing system. For example, a machine learning model used to determine whether a user should be granted access to access-controlled or otherwise restricted computing resources may generate various predictive risk scores that identify a likelihood of a user being an unauthorized or otherwise malicious user of the computing system, a likelihood of a request to perform an action within the computing system being a fraudulent request that would result in the misuse or fraudulent transfer of resources within the computing system, or the like. In another example, a machine learning model used to determine whether to deliver a customized message to a user of a software application may generate scores that identify a likelihood of the customized message being relevant to the user of the software application, a likelihood that the user of the software application is qualified for an offer included in the customized message (e.g., based on a risk profile associated with the user), or the like.

However, because multiple risk factors may play a role in determining whether a user should be granted access to resources in a computing system, whether the user should be denied access to resources in the computing system, whether to use resources in the computing system to deliver customized messaging to the user, or the like, multiple models may be used to model different risk metrics in order to generate actionable data based on which decisions of whether to grant or disallow access to resources or otherwise use computing resources are made. Each of the multiple models may operate independently, with each model incurring a computational overhead (e.g., in terms of processing cycles, power consumption, memory utilization, bandwidth consumption, or the like) in order to generate an independent predictive score that can be used to make decisions on whether to grant access to, deny access to, or otherwise allow the use of computing resources in a computing system. However, these models may, in fact, predict different (potentially related) outcomes based on a common set of inputs. Because these models may use a common set of inputs to generate different (potentially related) predictions, generating these different predictions may involve repeated computation and thus may waste computing resources that could be used for other purposes.

Aspects of the present disclosure provide techniques for training and using multi-output machine learning models to predict a likelihood of different events occurring using a single machine learning model. As discussed in further detail herein, a multi-output machine learning model can be trained to predict a likelihood of a single event occurring over different time windows and/or a likelihood of different (related) events occurring over the same time window or different time windows. Because the multi-output machine learning model can be trained using the same training data set to perform predictions related to the same or at least related events, aspects of the present disclosure may allow for a single predictive model to be trained, maintained (e.g., retrained or refined based on new training data derived from user activity within a computing system), and used in a computing system. Further, because the multi-task, multi-output model may be trained to generate responses based on cut-off points defined within the model itself, aspects of the present disclosure may allow for decisions to be performed within a software application using the model without the application itself defining such rules, thus allowing for software applications to be updated to reflect new rules through the refining of a multi-task, multi-output machine learning model used by these applications. By doing so, aspects of the present disclosure may reduce the amount of computing resources (e.g., processor time, memory, etc.) used in training discrete machine learning models to predict events over different time periods or to predict different types of events which may be related to each other.

Example Training Predictive Risk Models and Generating Offers Using the Predictive Risk Models FIG. 1 illustrates an example computing environment 100 in which predictive models are trained and used to generate offers to be presented to users of a software application. As illustrated, computing environment 100 includes a model training system 110, and application server 120, and transaction history repository 130.

Model training system 110 generates training data sets from user activity history data (e.g., transaction history data, login/access history data, etc.) associated with various users of a software application and trains a predictive risk model using the generated training data sets. Model training system 110 may be any of a variety of computing devices that can generate training data sets and train predictive models based on these training data sets, such as a server computer, a cluster of computers, cloud computing instances, or the like. As illustrated, model training system 110 includes a training data set generator 112 and a predictive risk model trainer 114.

Training data set generator 112 may be configured to retrieve transaction history data for a plurality of users of a software application from transaction history repository 130 and generate one or more training data sets from the transaction history data. The training data set generator 112 can, in some aspects, establish unique training data sets for use in training a multi-output, multi-task machine learning model (e.g., model that is configured to generate outputs predicting a likelihood of an event occurring or not occurring with respect to a user of a software application over different time windows, a model that is configured to generate outputs predicting likelihoods of different events occurring or not occurring with respect to a user of a software application, etc.). In some aspects, for models used to predict the risk of a specified event occurring or not occurring over different time periods, the training data set generator 112 can initially bifurcate the transaction history data for each of these different time periods into a first set of transaction history data associated with users who have an external risk propensity score and a second set of transaction history data associated with users who do not have an external risk propensity score.

In some aspects, the features extracted from the transaction history data set and included in the one or more training data sets may be a subset of a universe of features that can be extracted from the transaction history data set or otherwise used to train a predictive risk model. The subset of features may be selected based on a predictive power of each feature in the universe of features calculated from a historical data set of event outcomes. In one example, for a model trained to predict whether activity in a computing system is fraudulent or legitimate, the features extracted from the transaction history data set and included in the one or more training data sets may include features such as a timestamp associated with a login attempt, a location from which the login attempt was received, a number of previously unsuccessful login attempts performed within a time period from the login attempt, and other features predictive of whether access activity is legitimate or fraudulent. In another example, assume that the transaction history data set is associated with users who have received a loan. A positive outcome would generally correspond to the payment of the loan in full on or before a maturity date, while a negative outcome would generally correspond to payment of only a portion of the loan by the maturity date or other default event indicating that the loan was not satisfied in full.

In some aspects, to determine what features are likely to be relevant to a predictive risk model and what features are unlikely to be relevant to the predictive risk model, a weight of evidence metric and an information value metric may be calculated for each feature in the universe of features. Generally, the weight of evidence metric indicates the predictive power of a metric in relation to a positive or negative outcome for some event, such as a loan issued to a user. To calculate the weight of evidence metric for a feature, values of the feature can be divided into a plurality of bins. Within each bin, a number of events (e.g., failures to satisfy an obligation) and a number of non-events (e.g., satisfaction of an obligation) can be calculated, and the weight of evidence metric for a specific bin may be calculated as the natural log of the rate at which non-events occurred within the bin divided by the rate at which events occurred within the bin (e.g., according to the equation $$WoE = \ln \frac{PctOfNonEvents}{PctOfEvents}),$$

where PctOfNonEvents is the percentage of events in the bin of transaction data that do not correspond to negative event outcomes, and PctOfEvents is the percentage of events in the bin of transaction data that correspond to negative event outcomes. The information value metric may be calculated for the metric based on a summation of the difference between the rate at which non-events occurred and the rate at which events occurred within each bin, multiplied by the weight of evidence metric (e.g., according to the equation $$IV = \sum_{i=0}^{n-1} (PctOfNonEvents_i - PctOfEvents_i) \times WoE,$$

where n represents the number of bins into which the metric was divided).

Features included in the subset of features included in the training data set(s) may generally be the features having a weight of evidence metric exceeding a threshold value and an information value metric indicating that a metric has at least some predictive power. In some aspects, the features having information value metrics exceeding some threshold value may be selected further based on a normalized gain metric and a validation sample, which may result in the selection of a minimal set of features to be used in training the predictive risk models. A gain metric associated with a feature may correspond to the relative contribution of a feature to classifications made by a predictive risk model (e.g., a contribution of a feature to a classification of a user into one of a plurality of risk segments using the predictive risk model). A normalized gain metric for a feature may be calculated by dividing the gain metric for the feature by the sum of the gains calculated over each of the features included in a training data set and used to initially train the predictive risk model. A subset of the features from the universe of features may be selected for use in generating the training data set by maximizing various model performance statistics, such as a Kolmogorov-Smirnov test measuring the distance between two probability distributions from the transaction history data set.

Predictive risk model trainer 114 generally trains a multi-task, multi-output machine learning model based on the training data set generated by the training data set generator 112. Generally, the multi-event, multi-output machine learning model may be trained to generate a predictive score indicating a likelihood that a specified event will occur based on the training data set, a probability of an event being fraudulent or legitimate, or the like. In some aspects, a specified event may include, for example, a failure to complete a transaction (e.g., on the terms set forth for the transaction when the transaction was originated, such as when a loan is originated to a user). For a model trained to predict whether an event is fraudulent or legitimate, a fraudulent event may correspond to an access event or other restricted activity within a computing system that is not authorized by the real owner or otherwise an authorized user of a protected set of computing resources in a restricted access system, while a legitimate event may correspond to an access event or other restricted activity within the computing system that is authorized by the real owner or other authorized user of the protected set of computing resources. The risk propensity score may be, for example, a score between 0 and 1, where a 1 value indicates that a user has a high likelihood of failing to complete a transaction or has a high likelihood of having initiated fraudulent activity within a computing system and a 0 value indicates that a user has a low likelihood of failing to complete a transaction or has a low likelihood of having initiated fraudulent activity within the computing system (or vice versa).

In some aspects, the multi-task, multi-output predictive risk models may be regularizing gradient boosting models, such as an XGBoost model. The regularizing gradient boosting model may include local explainability values associated with each feature of the plurality of features. These local explainability value may indicate, for example, the effect of a given feature value on the output of the model and may be used within a software application to explain, to a user of the software application, why the user received a particular offer, how the user's risk propensity score was generated and what factors contributed to the user's risk propensity score, and the like. These local explainability values allow for decisions made using the predictive risk models to be explained, which may give users of a software application insight into how and why an application reached a particular outcome, unlike black-box models that do not allow for any explanation of how and why a particular outcome was generated for a user.

In some aspects, the multi-task, multi-output predictive risk models may be a machine learning model including a plurality of cross-task layers and a plurality of task-specific layers. The cross-task layers may perform various machine learning model operations (e.g., convolution, attention, etc.), with the outputs of these common layers being usable in other common layers or a task-specific layer of the multi-task, multi-output predictive risk model. The task-specific layer(s) of the multi-task, multi-output predictive risk model generally include layers that perform predictive tasks specific to one of a plurality of tasks for which the multi-task, multi-output predictive risk model is trained. In some aspects, the multi-task, multi-output predictive risk layers may include output layers that use a regularizing function (e.g., a softmax function, a rectified linear unit (ReLU), etc.) that generates an ultimate prediction of whether a specified event is likely to occur or not occur for a user of the software application.

In some aspects, the predictive risk model trainer 114 can generate a segmentation matrix based on the outputs of the multi-task, multi-output predictive risk model. In doing so, the predictive risk model trainer 114 can generate predictions for data in a validation data set derived from user history data in the transaction history repository 130. The predictive scores for each task or event for which the multi-task, multi-output predictive risk model is trained may be quantized into M buckets. In some aspects each of the M buckets may include a similar number of samples. An occurrence of negative predictions within the $i^{th}$ bucket may be calculated and placed into the segmentation matrix. The occurrence rate placed into the segmentation may be a raw number of occurrences of negative predictions for a given task and scoring bucket, a percentage of occurrences of negative predictions within a bucket, or the like. In some aspects, the scores generated by the multi-task, multi-output predictive risk model may be combined with external risk scores to generate a two-dimensional segmentation risk matrix for each bucket M and each task for which the multi-task, multi-output predictive risk model is trained. Generally, a set of rules defined for the external risk score may be used to add dimensionality to the results generated by the multi-task, multi-output predictive risk model.

Generally, the multi-task, multi-output predictive risk model can be used to identify threshold values for risk based on different criteria. For example, for each bucket in which outputs of the multi-task, multi-output predictive risk model are organized (e.g., for a particular task and score range), threshold values may be defined for positive outcomes (corresponding to low risk of a negative event occurring), negative outcomes (corresponding to high risk of a negative event occurring), and a range of intermediate outcomes (e.g., corresponding to different levels of moderate risk of a negative event occurring). To allow for a multi-task, multi-output predictive risk model to incorporate policies and generate an output which explicitly identifies a decision made by the machine learning model of whether to allow or disallow a task, the rates at which negative events occur within each bucket, given a set of training or validation data, may be used to assign a policy or rule for a combination of score and task. Generally, within the multi-task, multi-output predictive risk model, these rules may instruct an application to grant access or otherwise allow a user to perform a task within the application, perform further analysis of user data in order to determine whether to allow or disallow access, or may disallow access or otherwise block a user from performing a task within the application.

Training of a machine learning model described herein may involve supervised learning techniques. Supervised learning generally involves providing training inputs (e.g., features) as inputs to the machine learning model. The machine learning model processes the training inputs and produces outputs based on the training inputs. For example, an output layer of the machine learning model may be configured to output predictions for each of one or more output variables. The predictions may be normalized values (e.g., floating point values) between 0 and 1, such as being produced via a sigmoid function or other function in an output layer of the machine learning model that produces normalized values for each of the one or more output variables. The outputs may be compared to the labels associated with the training inputs (e.g., labels indicating ground truth based on the transaction history data, such as actual outcomes for the one or more output variables in association with the input features) to determine the accuracy of the model, and parameters of the machine learning model may be iteratively adjusted until one or more conditions are met. For instance, the one or more conditions may relate to a loss function for optimizing one or more variables (e.g., relating to model accuracy). In some embodiments, the conditions may relate to whether the predictions produced by the model based on the training inputs match the labels associated with the training inputs or whether a measure of error between training iterations is not decreasing or not decreasing more than a threshold amount. The conditions may also include whether a training iteration limit has been reached. Parameters of the machine learning model adjusted during training may include, for example, hyperparameters, values related to numbers of iterations, weights, functions used by nodes to calculate scores, and the like. In some embodiments, validation and testing are also performed for the machine learning model, such as based on validation data and test data, as is known in the art.

After training the multi-task, multi-output predictive risk model and generating the user segmentation matrix, the predictive risk model trainer 114 generally deploys the multi-task, multi-output predictive risk model and the user segmentation matrix to an application server 120 for use in generating offers to users of an application 122 executing on the application server 120. For example, as illustrated, the plurality of predictive risk models may be deployed to a risk prediction engine 124 executing on or otherwise associated with application server 120.

Application server 120 generally hosts an application which may be accessed by users of the application and may provide a set of functions to users of the application. As illustrated, application server 120 includes an application 122 and risk prediction engine 124.

In some aspects, various events within the application 122 may trigger the application to use the multi-task, multi-output predictive risk model deployed to the risk prediction engine 124 to determine whether to allow or disallow activity for a user of the application 122. For example, during execution of the application 122, the application 122 may determine whether or not a user should be presented an offer, whether a user should be granted access to protected computing resources in a computing system (e.g., on the application server 120 or accessible through the application server 120), whether a user should be allowed to perform a task for which authorization is required within a computing system (e.g., on the application server 120 or accessible through the application server 120), or the like. Such a determination may be, for example, based on user interaction with the application 122 indicating that a user is transitioning from one workflow in the application 122 to another workflow in the application 122, based on an amount of time spent within the application, or the like. When the application 122 determines that a prediction is to be performed with respect to the user and the user's activity within a computing system hosted on or accessible through the application server 120, the application 122 may provide user information to the risk prediction engine 124 and the instruct risk prediction engine 124 to generate a predictive risk score for a plurality of events (e.g., the occurrence of a same event over different time windows, the occurrence of different but related events, etc.) for use in determining whether to perform a specified action with respect to the user and the current state of the application 122. Subsequently, the application 122 may receive, from the risk prediction engine 124, a predictive risk score for the user and can use the score and/or the user segmentation model to determine whether to perform a task.

For example, if the predictive risk scores generated by the risk prediction engine 124 indicate that the user has a low risk of being fraudulent or failing to perform a specified event over each of a plurality of time windows, the application 122 can allow an action to be performed with respect to the user. For example, the application 122 can grant access to protected computing resources, can allow the execution of actions in the application 122 or within a computing system accessible through the application server 120 which are access-controlled, generate a message to a user of the application 122 including an offer for which the user is qualified, determine the terms of such an offer, or the like.

In another example, if the predictive risk scores generated by the risk prediction engine 124 indicate that the user has a high risk of being fraudulent or failing to perform a specified event over each of a plurality of time windows, the application 122 can block an action from being performed with respect to the user. For example, the application 122 can block access to protected computing resources, can block the execution of actions in the application 122 or within a computing system accessible through the application server 120 which are access-controlled, decline to generate a message to a user of the application 122 including an offer for a product or service for which the user is unlikely to qualify, or the like.

In one example, based on the classification of the user into one of a plurality of risk classifications, the application 122 can generate an offer for the user. Generally, the application 122 may be configured to generate offers with higher interest rates or more restrictions for users having higher risk classifications and may be configured to generate offers with lower interest rates or fewer restrictions (e.g., whether the loan is secured or unsecured, limitations on what the loan can be used for, etc.) for users having lower risk classifications. In some aspects, where the predictive risk scores generated by the risk prediction engine 124 are used to generate offers of loan products for users of application 122, the application 122 can generate one or more offers, each with a unique combination of rate, tenor, and amount, according to the risk classification for the user. In some aspects, various rules may be used to determine the combination of rate, term, and amount offered to a user. For example, different risk classifications may be associated with different minimum rates, different maximum amounts, and/or different maximum terms, to account for the amount of risk associated with users in a given risk classification. Users with the highest risk classifications from a user segmentation model may have the highest minimum rate, shortest term, and/or smallest amount parameters, and users in lower risk classifications may have lower minimum rates, longer terms, and/or larger amount parameters.

The risk prediction engine 124 generally receives user information from application 122 and generates a predictive risk score and (in some aspects) risk classification for the user.

Based on the predictive risk scores generated by the multi-task, multi-output predictive risk model deployed to the risk prediction engine 124, a classification of the user into one of a plurality of risk classifications may be performed. Generally, the classification of the user may be based on a user segmentation model that divides users into one of a plurality of risk classification segments. For users having external risk classification scores, the user segmentation model may be based on the user's external risk propensity score and the risk score generated by the risk prediction engine 124. For users lacking external risk classification scores, the user segmentation model may be solely based on the risk score generated by the risk prediction engine 124.

Example User Segmentation Matrix Generated Using a Multi-Task, Multi-Output Predictive Risk Models FIG. 2 illustrates an example user segmentation matrix 200 generated by a predictive model trainer (e.g., by the predictive risk model trainer 114 illustrated in FIG. 1) for users based on based on the predictive risk scores generated by a multi-task, multi-output predictive risk model.

As illustrated in FIG. 2, the user segmentation model 200 generated and deployed by predictive risk model trainer 114 and used to generate scores or classifications used by an application (e.g., the application 122 illustrated in FIG. 1) to determine whether to allow or disallow execution of an action within the application 122 or in a computing system accessible through the application 122. As illustrated, the user segmentation model 200 may be divided into a plurality of segments for each task for which the multi-task, multi-output predictive risk model is trained. For example, the number of segments may correspond to M buckets into which predictive risk scores generated by the multi-task, multi-output predictive risk model can be quantized, such that the user segmentation model 200 corresponds to a two-dimensional matrix of N tasks by M buckets. In some aspects (though not illustrated in FIG. 2), the classifications in each segment may be a two-dimensional matrix itself, with one dimension corresponding to risk classifications associated with users having an external risk score and the other dimension corresponding to risk classifications associated with users who do not have an external risk score.

In some aspects, the user segmentation matrix 200 may be combined into a matrix (e.g., an array) having fewer dimensions than the user segmentation matrix 200 using various dimensionality reduction techniques. These dimensionality reduction techniques may be supervised or unsupervised techniques which can be used to reduce the complexity of the user segmentation matrix 200 into a combined matrix based on the sums of scores for each of a plurality of tasks for which the multi-task, multi-output predictive risk model is trained. In some aspects, to do so, a multidimensional tensor may be generated from the user segmentation matrix 200, and a nonlinear manifold learning dimensionality reduction technique can be used to generate the reduced-dimensionality matrix.

In some aspects, the reduced dimensionality matrix may be a one-dimensional matrix. In generating a risk classification for each segment in the reduced dimensionality matrix, the predictive risk score calculated for a user of the application 122 may be combined, and the combined score may be used to assign the user to one of a plurality of risk classifications in the one-dimensional matrix. In some aspects, the reduced dimensionality matrix may be a two-dimensional matrix, with different segments in the two-dimensional matrix corresponding to risk classifications for different combinations of task and risk classification score.

Example Methods for Training and Using Multi-Task, Multi-Output Predictive Risk Models Based on User Transaction History to Control Activity in a Software Application FIG. 3 illustrates example operations 300 that may be performed to train a multi-task, multi-output machine learning model based on a transaction history data set, in accordance with aspects of the present disclosure. Operations 300 may be performed, for example, by the model training system 110 illustrated in FIG. 1 or other computing devices on which predictive models can be trained.

As illustrated, operations 300 begin at block 310, with extracting, from a transaction history data set for a plurality of users of a software application, a plurality of features for each user of the plurality of users having records in the transaction history data set.

At block 320, the operations 300 proceed with generating a training data set based on the extracted plurality of features for each user of the plurality of users.

At block 330, the operations 300 proceed with training a multi-output machine learning model to generate a plurality of predictive classifications for an input of the plurality of features based on the training data set. Generally, each respective predictive classification of the plurality of predictive classifications may be associated with a respective likelihood of whether a specified event will occur for a user of a computing system.

In some aspects, the multi-output machine learning model comprises a regularizing gradient boosting model with local explainability values associated with one or more features in the input.

In some aspects, the multi-output machine learning model comprises a convolutional neural network including a set of layers common to the plurality of predictive classifications and a plurality of classification task-specific layers, each respective layer of the plurality of classification task-specific layers being associated with a respective classification task.

In some aspects, the plurality of predictive classifications are associated with a likelihood of a same event occurring over different time windows.

In some aspects, the plurality of predictive classifications are associated with different types of events.

FIG. 4 illustrates example operations 400 that may be performed to determine whether to allow or block execution of events in a software application based on predictive risk scores generated by a multi-task, multi-output predictive risk model trained using transaction history data. The operations 400 may be performed, for example, by a risk prediction engine or other engine on which one or more predictive models is deployed, such as the risk prediction engine 124 illustrated in FIG. 1.

As illustrated, operations 400 begin at block 410, with receiving, from a user of a computing system, a request to execute a task in the computing system. In some aspects, the request to execute a task in the computing system may include a request to load a new portion of a workflow within a software application executing on the computing system. A transition between the currently loaded portion of the workflow in the software application and a new portion of the workflow may be, for example, a spot in which a decision of whether to present an offer to the user of the software application (e.g., in an interstitial page between the currently loaded portion and the new portion of the workflow) may be performed. In some aspects, the request to execute a task in the computing system may include a request to access restricted resources or other digital assets in the computing system or to perform a task in the computing system for which permission is required. For example, the task may include transferring assets from the user to another user of the software application.

At block 420, the operations 400 proceed with generating, based on the request, an input feature vector based on historical data associated with the user.

At block 430, the operations 400 proceed with requesting, from a multi-output machine learning model, a plurality of predictive classifications based on the input feature vector. Generally, each respective predictive classification of the plurality of predictive classifications is associated with a respective likelihood of whether a specified event will occur for the user.

At block 440, the operations 400 proceed with executing the task based on the plurality of predictive classifications.

In some aspects, the plurality of predictive classifications are associated with a likelihood of a same event occurring over different time windows.

In some aspects, the plurality of predictive classifications are associated with different types of events.

In some aspects, the operations 400 further include reducing the plurality of predictive classifications into a single classification score, wherein the task is executed based on the single classification score. The single classification score identifies, in a user segmentation model, a risk segment in which the user lies and may be used (e.g., at block 440) to determine whether to execute the task.

In some aspects, the input feature vector is generated based on a historical transaction history data set for the user.

In some aspects, each classification of the plurality of predictive classifications is associated with a range of external risk scores.

In some aspects, the multi-output machine learning model comprises a regularizing gradient boosting model with local explainability values associated with one or more features in the input feature vector.

In some aspects, the multi-output machine learning model comprises a convolutional neural network including a set of layers common to the plurality of predictive classifications and a plurality of classification task-specific layers, each respective layer of the plurality of classification task-specific layers being associated with a respective classification task.

In some aspects, the plurality of predictive classifications indicate whether the request is a fraudulent or legitimate request to perform the task in the computing system.

Example Systems for Training and Using Predictive Risk Models to Perform Actions in a Software Application FIG. 5 illustrates an example system 500 in which predictive risk models are trained and used to determine whether to execute requested actions in a software application. System 500 may correspond to one or both of the model training system 110 and the application server 120 illustrated in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508.

CPU 502 is included to be representative of a single CPU, multiple CPUs, a single CPU having multiple processing cores, and the like.

Memory 508 is representative of a volatile memory, such as a random-access memory, or a nonvolatile memory, such as nonvolatile random access memory, phase change random dom access memory, or the like. As shown, memory 508 includes a training data set generator 520, predictive risk model trainer 530, application 540, risk prediction engine 550, and transaction history repository 560.

Training data set generator 520 generally corresponds to training data set generator 112 illustrated in FIG. 1. Generally, training data set generator 520 uses a transaction history data set from transaction history repository 560 to generate one or more training data sets. The one or more training data sets may include a first training data set for users having external risk scores and a second training data set for users lacking external risk scores. Generally, the training data sets generated by training data set generator may include a plurality of features extracted from the transaction history data set for each user of a plurality of users, and these features may be selected based on the predictive power of such features.

Predictive risk model trainer 530 generally corresponds to predictive risk model trainer 114 illustrated in FIG. 1. Generally, predictive risk model trainer 530 uses the training data sets generated by training data set generator 520 to train a multi-task, multi-output predictive risk models based on transaction history data for users of application 540 (and potentially other users who may not use application 540 but for which data exists in transaction history repository 560). The multi-task, multi-output predictive risk model may be a single model trained to generate a risk classification for a user, with the predicted risk being for a same task over different time windows and/or for different though related tasks. The predictive risk models may be regularizing gradient boosting models with local explainability values associated with each feature of the plurality of features included in the training data sets.

Application 540 generally corresponds to application 122 illustrated in FIG. 1. Generally, application 540 receives requests from users of the application 540 for various features or functionality of the application and executes actions based on the risk classification generated by the multi-task, multi-output predictive risk model deployed to the risk prediction engine 550.

Risk prediction engine 550 generally corresponds to risk prediction engine 124 illustrated in FIG. 1. Generally, risk prediction engine 550 uses the predictive models trained by predictive risk model trainer 530 and user transaction data retrieved from transaction history repository 560 to determine a risk classification for a user of application 540

Note that FIG. 5 is just one example of a system, and other systems including fewer, additional, or alternative components are possible consistent with this disclosure.

EXAMPLE CLAUSES

Implementation examples are described in the following numbered clauses:

Clause 1: A processor-implemented method, comprising: receiving, from a user of a computing system, a request to execute a task in the computing system; generating, based on the request, an input feature vector based on historical data associated with the user; requesting, from a multi-output machine learning model, a plurality of predictive classifications based on the input feature vector, wherein each respective predictive classification of the plurality of predictive classifications is associated with a respective likelihood of whether a specified event will occur for the user; and executing the task based on the plurality of predictive classifications.

Clause 2: The method of Clause 1, wherein the plurality of predictive classifications are associated with a likelihood of a same event occurring over different time windows.

Clause 3: The method of any one of Clauses 1 or 2, wherein the plurality of predictive classifications are associated with different types of events.

Clause 4: The method of any one of Clauses 1 through 3, further comprising reducing the plurality of predictive classifications into a single classification score, wherein the task is executed based on the single classification score.

Clause 5: The method of Clause 4, wherein the single classification score identifies, in a user segmentation model, a risk segment in which the user lies.

Clause 6: The method of any one of Clauses 1 through 5, wherein the input feature vector is generated based on a historical transaction history data set for the user.

Clause 7: The method of any one of Clauses 1 through 6, wherein each classification of the plurality of predictive classifications is associated with a range of external risk scores.

Clause 8: The method of any one of Clauses 1 through 7, wherein the multi-output machine learning model comprises a regularizing gradient boosting model with local explainability values associated with one or more features in the input feature vector.

Clause 9: The method of any one of Clauses 1 through 8, wherein the multi-output machine learning model comprises a convolutional neural network including a set of layers common to the plurality of predictive classifications and a plurality of classification task-specific layers, each respective layer of the plurality of classification task-specific layers being associated with a respective classification task.

Clause 10: The method of any one of Clauses 1 through 9, wherein the task comprises transferring assets from the user to another user of a software application.

Clause 11: The method of any one of Clauses 1 through 10, wherein the task comprises accessing one or more access-controlled digital assets in an electronic system.

Clause 12: The method of any one of Clauses 1 through 11, wherein the plurality of predictive classifications indicates whether the request is a fraudulent or legitimate request to perform the task in the computing system.

Clause 13: A processor-implemented method, comprising: extracting, from a transaction history data set for a plurality of users of a software application, a plurality of features for each user of the plurality of users having records in the transaction history data set; generating a training data set based on the extracted plurality of features for each user of the plurality of users; and training a multi-output machine learning model to generate a plurality of predictive classifications for an input of the plurality of features based on the training data set, wherein each respective predictive classification of the plurality of predictive classifications is associated with a respective likelihood of whether a specified event will occur for a user of a computing system.

Clause 14: The method of Clause 13, wherein the multi-output machine learning model comprises a regularizing gradient boosting model with local explainability values associated with one or more features in the input.

Clause 15: The method of any one of Clauses 13 or 14, wherein the multi-output machine learning model comprises a convolutional neural network including a set of layers common to the plurality of predictive classifications and a plurality of classification task-specific layers, each respective layer of the plurality of classification task-specific layers being associated with a respective classification task.

Clause 16: The method of any one of Clauses 13 through 15, wherein the plurality of predictive classifications are associated with a likelihood of a same event occurring over different time windows.

Clause 17: The method of any one of Clauses 13 through 16, wherein the plurality of predictive classifications are associated with different types of events.

Clause 18: A system, comprising: a memory having executable instructions stored thereon; and a processor configured to execute the executable instructions to perform the methods of any one of Clauses 1 through 17.

Clause 19: A system, comprising: means for performing the methods of any one of Clauses 1 through 17.

Clause 20: A computer-readable medium having instructions stored thereon which, when executed by a processor, performs the methods of any one of Clauses 1 through 17.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise several software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method implemented by a computing system comprising one or more processors and at least one memory, the method comprising:

receiving, from a user of a computing system, a request to execute a task in the computing system;

generating, based on the request, an input feature vector based on historical data associated with the user;

requesting, from a multi-output machine learning model, a plurality of predictive classifications based on the input feature vector, wherein each respective predictive classification of the plurality of predictive classifications is associated with a respective probability of whether a specified event will occur for the user, and wherein the multi-output machine learning model includes a set of layers common to the plurality of predictive classifications and a plurality of classification task-specific layers, each respective layer of the plurality of classification task-specific layers being associated with a respective classification task; and executing the task based on the plurality of predictive classifications.

2. The method of claim 1, wherein the plurality of predictive classifications is associated with a probability of a same event occurring over different time windows.

3. The method of claim 1, wherein the plurality of predictive classifications is associated with different types of events.

4. The method of claim 1, further comprising reducing the plurality of predictive classifications into a single classification score, wherein the task is executed based on the single classification score.

5. The method of claim 4, wherein the single classification score identifies, in a user segmentation model, a risk segment in which the user lies.

6. The method of claim 1, wherein the input feature vector is generated based on a historical transaction history data set for the user.

7. The method of claim 1, wherein each classification of the plurality of predictive classifications is associated with a range of external risk scores.

8. The method of claim 1, wherein the multi-output machine learning model comprises a regularizing gradient boosting model with local explainability values associated with one or more features in the input feature vector.

9. The method of claim 1, wherein the multi-output machine learning model comprises a convolutional neural network.

10. The method of claim 1, wherein the task comprises transferring assets from the user to another user of a software application.

11. The method of claim 1, wherein the task comprises accessing one or more access-controlled digital assets in an electronic system.

12. The method of claim 1, wherein the plurality of predictive classifications indicates whether the request is a fraudulent or legitimate request to perform the task in the computing system.

13. A method implemented by a computing system comprising one or more processors and at least one memory, the method comprising:

extracting, from a transaction history data set for a plurality of users of a software application, a plurality of features for each user of the plurality of users having records in the transaction history data set;

generating a training data set based on the extracted plurality of features for each user of the plurality of users; and training a multi-output machine learning model to generate a plurality of predictive classifications for an input of the plurality of features based on the training data set, wherein each respective predictive classification of the plurality of predictive classifications is associated with a respective probability of whether a specified event will occur for a user of a computing system, and wherein the multi-output machine learning model includes a set of layers common to the plurality of predictive classifications and a plurality of classification task-specific layers, each respective layer of the plurality of classification task-specific layers being associated with a respective classification task.

14. The method of claim 13, wherein the multi-output machine learning model comprises a regularizing gradient boosting model with local explainability values associated with one or more features in the input.

15. The method of claim 13, wherein the multi-output machine learning model comprises a convolutional neural network.

16. The method of claim 13, wherein the plurality of predictive classifications is associated with a probability of a same event occurring over different time windows.

17. The method of claim 13, wherein the plurality of predictive classifications is associated with different types of events.

18. A processing system, comprising:

at least one memory having executable instructions stored thereon; and one or more processors configured to execute the executable instructions to cause the processing system to:

receive, from a user of a computing system, a request to execution of a task in the computing system;

generate an input feature vector based on historical data associated with the user, request, from a multi-output machine learning model, a plurality of predictive classifications, wherein each respective predictive classification is associated with a respective probability of whether a specified event will occur for the user, and wherein the multi-output machine learning model includes a set of layers common to the plurality of predictive classifications and a plurality of classification task-specific layers, each respective layer of the plurality of classification task-specific layers being associated with a respective classification task; and execute the task based on the plurality of predictive classifications.

19. The processing system of claim 18, wherein the plurality of predictive classifications comprises a plurality of predictive classifications associated with a probability of a same event occurring over different time windows.

20. The processing system of claim 18, wherein the plurality of predictive classifications comprises a plurality of predictive classifications associated with different types of events.

* * * * *